United States Patent
Tsujimura et al.

(10) Patent No.: US 8,583,336 B2
(45) Date of Patent: Nov. 12, 2013

(54) POWER TRANSMISSION CONTROL APPARATUS FOR VEHICLE

(75) Inventors: Manabu Tsujimura, Anjo (JP); Takeshige Miyazaki, Chiryu (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 472 days.

(21) Appl. No.: 13/018,579

(22) Filed: Feb. 1, 2011

(65) Prior Publication Data
US 2011/0238276 A1    Sep. 29, 2011

(30) Foreign Application Priority Data
Mar. 23, 2010    (JP) ................................ 2010-066301

(51) Int. Cl.
*G06F 7/00*    (2006.01)
*G06F 17/00*    (2006.01)
*G06F 19/00*    (2011.01)

(52) U.S. Cl.
USPC .......................................... 701/68; 74/473.1

(58) Field of Classification Search
USPC ......... 74/34, 473.1, 33, 35, 74, 72, 30; 701/2, 701/68, 6, 5; 477/1, 7, 5; 474/7
See application file for complete search history.

(56) References Cited

U.S. PATENT DOCUMENTS

| | | | | |
|---|---|---|---|---|
| 4,548,101 A | * | 10/1985 | Akashi et al. | 74/720 |
| 4,566,348 A | * | 1/1986 | Akashi et al. | 74/359 |
| 4,576,063 A | * | 3/1986 | Akashi et al. | 74/745 |
| 4,594,908 A | * | 6/1986 | Akashi et al. | 74/359 |
| 4,616,521 A | * | 10/1986 | Akashi et al. | 74/335 |
| 4,622,866 A | * | 11/1986 | Ito et al. | 477/122 |
| 5,272,630 A | * | 12/1993 | Brown et al. | 701/68 |
| 6,209,406 B1 | * | 4/2001 | Sperber et al. | 74/330 |
| 6,412,361 B1 | * | 7/2002 | Wolf et al. | 74/336 R |
| 7,204,166 B2 | * | 4/2007 | Gochenour | 74/340 |
| 7,252,621 B2 | * | 8/2007 | Tanba et al. | 477/77 |
| 7,347,803 B2 | * | 3/2008 | Kobayashi et al. | 477/5 |
| 7,351,182 B2 | * | 4/2008 | Kobayashi | 477/5 |
| 7,399,256 B2 | * | 7/2008 | Tanba et al. | 477/74 |
| 7,507,182 B2 | * | 3/2009 | Matsumura et al. | 477/174 |
| 7,736,270 B2 | * | 6/2010 | Gierer et al. | 477/175 |
| 7,771,317 B2 | * | 8/2010 | Gierer et al. | 477/175 |
| 7,798,928 B2 | * | 9/2010 | Serkh | 474/70 |

(Continued)

FOREIGN PATENT DOCUMENTS

JP    2010-048416 A1    3/2010

*Primary Examiner* — Thomas Black
*Assistant Examiner* — Robert Payne
(74) *Attorney, Agent, or Firm* — Burr & Brown

(57) ABSTRACT

First and second clutches correspond to systems which include "first gear" and "second gear," respectively. When the temperature of the first clutch at the time of start of the vehicle is lower than a first temperature, only the first clutch is used as a start clutch for driving the vehicle. When the temperature of the first clutch is not lower than the first temperature but is lower than a second temperature, both the first and second clutches are used as the start clutch. When the temperature of the first clutch is equal to or higher than the second temperature, only the second clutch is used as the start clutch. Thus, the higher the temperature of the first clutch, the smaller the load acting on the first clutch. When the temperature of the second clutch is high, engine torque is reduced, and a warning is issued.

11 Claims, 9 Drawing Sheets

(56) References Cited

U.S. PATENT DOCUMENTS

| | | | |
|---|---|---|---|
| 8,050,827 B2 * | 11/2011 | Hasegawa et al. | 701/51 |
| 8,287,432 B2 * | 10/2012 | Nedachi et al. | 477/175 |
| 2010/0048354 A1 | 2/2010 | Leibrandt et al. | |
| 2011/0196590 A1 * | 8/2011 | Ayabe et al. | 701/68 |
| 2012/0078457 A1 * | 3/2012 | Tajima et al. | 701/22 |
| 2012/0115679 A1 * | 5/2012 | Doering et al. | 477/70 |
| 2012/0216639 A1 * | 8/2012 | Renner | 74/331 |
| 2013/0012353 A1 * | 1/2013 | Yoshida et al. | 477/5 |

* cited by examiner

POWER TRANSMISSION CONTROL APPARATUS FOR VEHICLE

BACKGROUND OF THE INVENTION

1. Field of the Invention

The present invention relates to a power transmission control apparatus for a vehicle.

2. Description of the Related Art

As described in, for example, Japanese Patent Application Laid-Open (kokai) No. 2010-48416, there has been known a transmission which includes first and second input shafts for receiving power from an engine of a vehicle; an output shaft for outputting power to drive wheels of the vehicle; a first mechanism section which selectively establishes any one of some (odd gears including first gear) of all the gears to thereby form a power transmission system between the first input shaft and the output shaft; and a second mechanism section which selectively establishes any one of the remaining gears (even gears including second gear) to thereby form a power transmission system between the second input shaft and the output shaft.

This transmission includes first and second clutches in combination. The first clutch selectively achieves an engaged state so as to form a power transmission system between the output shaft of the engine and the first input shaft, or a disengaged state so as to cut off the power transmission system. The second clutch selectively achieves an engaged state so as to form a power transmission system between the output shaft of the engine and the second input shaft, or a disengaged state so as to cut off the power transmission system. A mechanism obtained through such a combination is called a "double clutch transmission (hereinafter also referred to as "DCT"). The first and second clutches are configured such that, by means of adjusting clutch stroke in an engaged state, the transmittable maximum torque (clutch torque) can be adjusted. In the following description, the system constituted by the first clutch, the first input shaft, and the first mechanism section will be referred to as the "first system," and the system constituted by the second clutch, the second input shaft, and the second mechanism section will be referred to as the "second system." An engaged state of each clutch in which slippage is involved will be referred to as a "half-engaged state," and an engaged state of each clutch in which no slippage is involved will be referred to as a "full-engaged state."

When the DCT is controlled, one gear to be achieved (hereinafter referred to as the "selected gear") is selected on the basis of a movement of a shift lever by a driver of the vehicle and/or travelling conditions of the vehicle. In the following description, of the first and second mechanism sections, the first and second clutches, the first and second input shafts, and the first and second systems, those corresponding to the selected gear will be referred to as the "selected mechanism section," the "selected clutch," the "selected input shaft," and the "selected system"; and those not corresponding to the selected gear will be referred to as the "unselected mechanism section," the "unselected clutch," the "unselected input shaft," and the "unselected system."

When a gear is selected, the selected clutch is controlled into an engaged state in a state in which the selected gear is established in the selected mechanism section, and the unselected clutch is controlled into a disengaged state. As a result, a power transmission system which has a speed reduction ratio for the selected gear is formed between the output shaft of the engine and the output shaft of the transmission via the selected system. Drive torque (engine torque) of the engine is transmitted to the drive wheels via the power transmission system, whereby the vehicle can be accelerated.

Meanwhile, in the unselected system, the unselected clutch is in a disengaged state. Accordingly, the unselected mechanism section can be caused to wait in a state in which a gear which is selected (may be selected) next is established. By making use of this, the following operation is enabled. Even in the case where a gear shift operation (upshift to a higher gear or downshift to a lower gear) results in reciprocal switching of the states of the first and second systems between the selected and unselected states, the engine torque can be continuously transmitted, without interruption, to the output shaft of the transmission (accordingly, to the drive wheels), through simultaneous execution of an "operation of bringing the engaged one of the first and second clutches into a disengaged state" and an "operation of bringing the disengaged one of the first and second clutches into an engaged state." As a result, gear shift shock can be reduced.

SUMMARY OF THE INVENTION

Incidentally, in a power transmission control apparatus in which a DCT is used, when a vehicle starts, in general, first gear is selected as the selected gear. That is, only the first clutch is used as a clutch for driving (starting) the vehicle (hereinafter referred to as a "start clutch"). When the brake pedal is released and the accelerator pedal is stepped on in the state in which the vehicle is stopped, the second clutch is maintained in a disengaged state, and the clutch torque of the first clutch is adjusted so as to bring the first clutch into a half-engaged state. As a result, the engine torque is transmitted to the drive wheels via the first system, whereby the vehicle starts.

Here, there is assumed a situation where a vehicle repeatedly starts and stops on a congested, long uphill. In this case, as shown in FIG. 11, while the second clutch is maintained in a disengaged state, the first clutch is repeatedly and alternately brought into a half-engaged state and a disengaged state. In a period in which a clutch is in a half-engaged state, because of slippage of the clutch, the clutch is apt to generate heat. Accordingly, the first clutch repeats such a period in which it is apt to generate heat. As a result, as shown in FIG. 11, the temperature of the first clutch increases excessively, leading to a problem of deteriorated durability of the first clutch.

In view of the foregoing, an object of the present invention is to provide a power transmission control apparatus for a vehicle in which a DCT is utilized and which can prevent occurrence of a situation where the temperature of a clutch increases excessively when the vehicle starts.

A power transmission control apparatus for a vehicle according to the present invention comprises a transmission (T/M) which includes a first input shaft (Ai1) for receiving power from a drive source (E/G) of a vehicle; a second input shaft (Ai2) for receiving power from the drive source; an output shaft (AO) for outputting power to drive wheels of the vehicle; a first mechanism section (M1) which selectively establishes any one of a plurality of gears or one gear, including first gear and being a portion of all the gears, to thereby form a power transmission system between the first input shaft and the output shaft; and a second mechanism section (M2) which selectively establishes any one of a plurality of gears or one gear, including second gear and being the remaining gears, to thereby form a power transmission system between the second input shaft and the output shaft. Preferably, a plurality of odd gears including first gear are provided as the plurality of gears of the first group, and a plurality of even gears including second gear are provided as the plurality of gears of the second group.

Furthermore, the power transmission control apparatus comprises a first clutch (C1) and a second clutch (C2). The first clutch (C1) selectively achieves an engaged state so as to form a power transmission system between the output shaft of the drive source and the first input shaft, or a disengaged state so as to cut off the power transmission system. The first clutch (C1) can adjust a clutch torque that is the maximum torque which can be transmitted by the first clutch in the engaged state. The second clutch (C2) selectively achieves an engaged state so as to form a power transmission system between the output shaft of the drive source and the second input shaft, or a disengaged state so as to cut off the power transmission system. The second clutch (C2) can adjust a clutch torque that is the maximum torque which can be transmitted by the second clutch in the engaged state. That is, this power transmission control apparatus is a power transmission control apparatus in which a DCT is used.

This power transmission control apparatus comprises control means (ECU) for selecting one gear as a selected gear on the basis of a movement of a shift operation member of the vehicle and/or a traveling state of the vehicle, for controlling a mechanism section selected from the first and second mechanism sections and corresponding to the selected gear so as to establish the selected gear, for controlling, in this state, a clutch selected from the first and second clutches and corresponding to the selected mechanism section so as to bring the selected clutch into the engaged state, and for controlling an unselected clutch different from the selected clutch so as to bring the unselected clutch into the disengaged state.

The feature of this power transmission control apparatus resides in that, when the vehicle starts, the control means selects either one or both of the first and second clutches as a start clutch, and adjusts the clutch torque(s) of the selected clutch(es) so as to bring the selected clutch(es) into a half-engaged state, which is the engaged state in which slippage is involved, to thereby start the vehicle. The control means may be configured to select either one or both of the first and second clutches as the start clutch on the basis of the temperature state of the first clutch.

By virtue of this configuration, in addition to or in place of the first clutch, the second clutch is used as the start clutch, depending on the temperature state of the first clutch. Accordingly, when the vehicle starts, the second clutch bears a portion or the entirety of the load acting on the entire start clutch. As a result, as compared with the conventional apparatus shown in FIG. 11 (the case where only the first clutch is used as the start clutch), the load acting on the first clutch decreases, whereby the occurrence of a situation in which the temperature of the first clutch increases excessively can be suppressed.

Here, "using the first clutch as the start clutch" means that "in a state in which first gear is established in the first mechanism section, the first clutch is controlled into the half-engaged state and the second clutch is controlled into the disengaged state." "Using the second clutch as the start clutch" means that "in a state in which second gear is established in the second mechanism section, the second clutch is controlled into the half-engaged state and the first clutch is controlled into the disengaged state." "Using both the first and second clutches as the start clutch" means that "in a state in which first and second gears are established in the first and second mechanism sections, respectively, each of the first and second clutches is controlled into the half-engaged state."

In the above-described power transmission control apparatus, the control means may be configured such that (only) the first clutch is used as the start clutch when the temperature of the first clutch is lower than a first temperature, and both the first and second clutches or (only) the second clutch is used as the start clutch when the temperature of the first clutch is equal to or higher than the first temperature.

In this case, more preferably, the control means may be configured such that both the first and second clutches are used as the start clutch when the temperature of the first clutch is not lower than the first temperature but is lower than a second temperature, which is higher than the first temperature, and (only) the second clutch is used as the start clutch when the temperature of the first clutch is equal to or higher than the second temperature. By virtue of this configuration, the higher the temperature of the first clutch, the lower the level to which the load acting on the first clutch can be reduced.

Alternatively, the control means may be configured such that (only) the first clutch is used as the start clutch when an increase in the temperature of the first clutch within a predetermined time is less than a first predetermined value, and both the first and second clutches or (only) the second clutch is used as the start clutch when the temperature increase is equal to or greater than the first predetermined value. This is based on the view that, even in the case where the current temperature of the first clutch is relatively low (lower than the first temperature), when the temperature increase within the predetermined time is large, the temperature of the first clutch is highly likely to increase (become equal to or higher than the first temperature) after a short period of time.

Alternatively, the control means may be configured such that (only) the first clutch is used as the start clutch when a temperature difference obtained by subtracting the temperature of the second clutch from that of the first clutch is less than a second predetermined value, and both the first and second clutches or (only) the second clutch is used as the start clutch when the temperature difference is equal to or greater than the second predetermined value. This is based on the view that, even in the case where the current temperature of the first clutch is relatively low (lower than the first temperature), when the temperature difference is large, the temperature of the first clutch is highly likely to increase (become equal to or higher than the first temperature) after a short period of time.

In the above-described power transmission control apparatus, preferably, when both the first and second clutches are used as the start clutch, a ratio of the clutch torque of the second clutch to the sum of the clutch torques of the first and second clutches (hereinafter called the "second clutch torque distribution ratio") is determined on the basis of the temperature of the first clutch, an amount by which an acceleration operation member is operated by a driver of the vehicle, and a (uphill) gradient of a road on which the vehicle starts.

By virtue of this configuration, the higher the temperature of the first clutch, the grater the value to which the second clutch torque distribution ratio can be set. Thus, the higher the temperature of the first clutch, the lower the level to which the load acting on the first clutch can be reduced. Also, the greater the operation amount of the acceleration operation member, the grater the value to which the second clutch torque distribution ratio can be set. Thus, the greater the load acting on the entire start clutch, the lower the value to which the ratio of the load acting on the first clutch can be reduced. As a result, the occurrence of a situation in which the temperature of the first clutch increases excessively can be prevented more reliably. In addition, the greater the uphill gradient of the road, the smaller the value to which the second clutch torque distribution ratio can be set so as to increase the clutch torque of the first clutch. Thus, the greater the uphill gradient, the greater the drive torque which can be provided to the vehicle. As a result, on an uphill road having a large gradient, the vehicle can be started with a sufficiently large drive force.

In the above-described power transmission control apparatus, preferably, when at least the second clutch is used as the start clutch and the temperature of the second clutch is higher than a third temperature, the drive torque of the drive source of the vehicle is reduced. Preferably, this a reduction ratio of the drive torque of the drive source is determined on the basis of the temperature of the second clutch, an amount by which an acceleration operation member is operated by a driver of the vehicle, and a gradient of a road on which the vehicle starts.

Using at least the second clutch as the start clutch means that the temperature of the first clutch is sufficiently high. In this case, the fact that the temperature of the second clutch is also high means that the load acting on the entire start clutch is excessively large. That is, in such a case, the load acting on the entire start clutch must be reduced. The above-described configuration is based on this knowledge.

In this case, preferably, when the temperature of the second clutch is higher than a fourth temperature, which is higher than the third temperature, the control means issues a warning, while reducing the drive torque of the drive source. By virtue of this configuration, it becomes possible to notify a driver of the vehicle that the clutches must be protected.

In the above-described power transmission control apparatus, preferably, when both the first and second clutches are used as the start clutch, the state of the second clutch is changed from the half-engaged state to the disengaged state before the state of the first clutch changes from the half-engaged state to a "full-engaged state which is the engaged state in which no slippage is involved."

DESCRIPTION OF THE PREFERRED EMBODIMENT

A power transmission control apparatus for a vehicle according to an embodiment of the present invention (present apparatus) will now be described with reference to the drawings. The present apparatus includes a transmission T/M, a first clutch C1, a second clutch C2, and an ECU. The transmission T/M has six gears (first to sixth gears) for moving the vehicle frontward, and a single gear (reverse gear) for moving the vehicle backward.

The transmission T/M includes a first input shaft Ai1, a second input shaft Ai2, an output shaft AO, a first mechanism section M1, and a second mechanism section M2. The first and second input shafts Ai1, Ai2 are coaxially supported by a casing (not shown) such that they can rotate relative to each other. The output shaft AO is supported by the casing at a position shifted from the first and second input shafts Ai1, Ai2, and in parallel with the first and second input shafts Ai1, Ai2.

The first input shaft Ai1 is connected via the first clutch C1 to an output shaft AE of an engine E/G, which is a drive source of the vehicle. Similarly, the second input shaft Ai2 is connected via the second clutch C2 to the output shaft AE of the engine E/G. The output shaft AO is connected to drive wheels of the vehicle for power transmission.

The first mechanism section M1 includes a first-gear drive gear G1$i$ and a first-gear driven gear G1$o$, which are in meshing engagement with each other at all times; a third-gear drive gear G3$i$ and a third-gear driven gear G3$o$, which are in meshing engagement with each other at all times; a fifth-gear drive gear G5$i$ and a fifth-gear driven gear G5$o$, which are in meshing engagement with each other at all times; a reverse drive gear GR$i$ and a reverse driven gear GR$o$, which are not in meshing engagement with each other at all times; and a reverse idle gear GR$d$ which is in meshing engagement with the drive gear GR$i$ and the driven gear GR$o$ at all times; and sleeves S1, S2. The sleeves S1, S2 are driven by sleeve actuators AS1, AS2, respectively.

Of the drive gears G1$i$, G3$i$, G5$i$, and GR$i$, the drive gears G1$i$ and GR$i$ are fixed to the first input shaft Ai1 for unitary rotation therewith; and the drive gears G3$i$ and G5$i$ are supported by the first input shaft Ai1 such that they can rotate relative to the first input shaft Ai1. Of the driven gears G1$o$, G3$o$, G5$o$, and GR$o$, the driven gears G1$o$ and GR$o$ are supported by the output shaft AO such that they can rotate relative to the output shaft AO; and the driven gears G3$o$ and G5$o$ are fixed to the output shaft AO for unitary rotation therewith.

Figure 1:
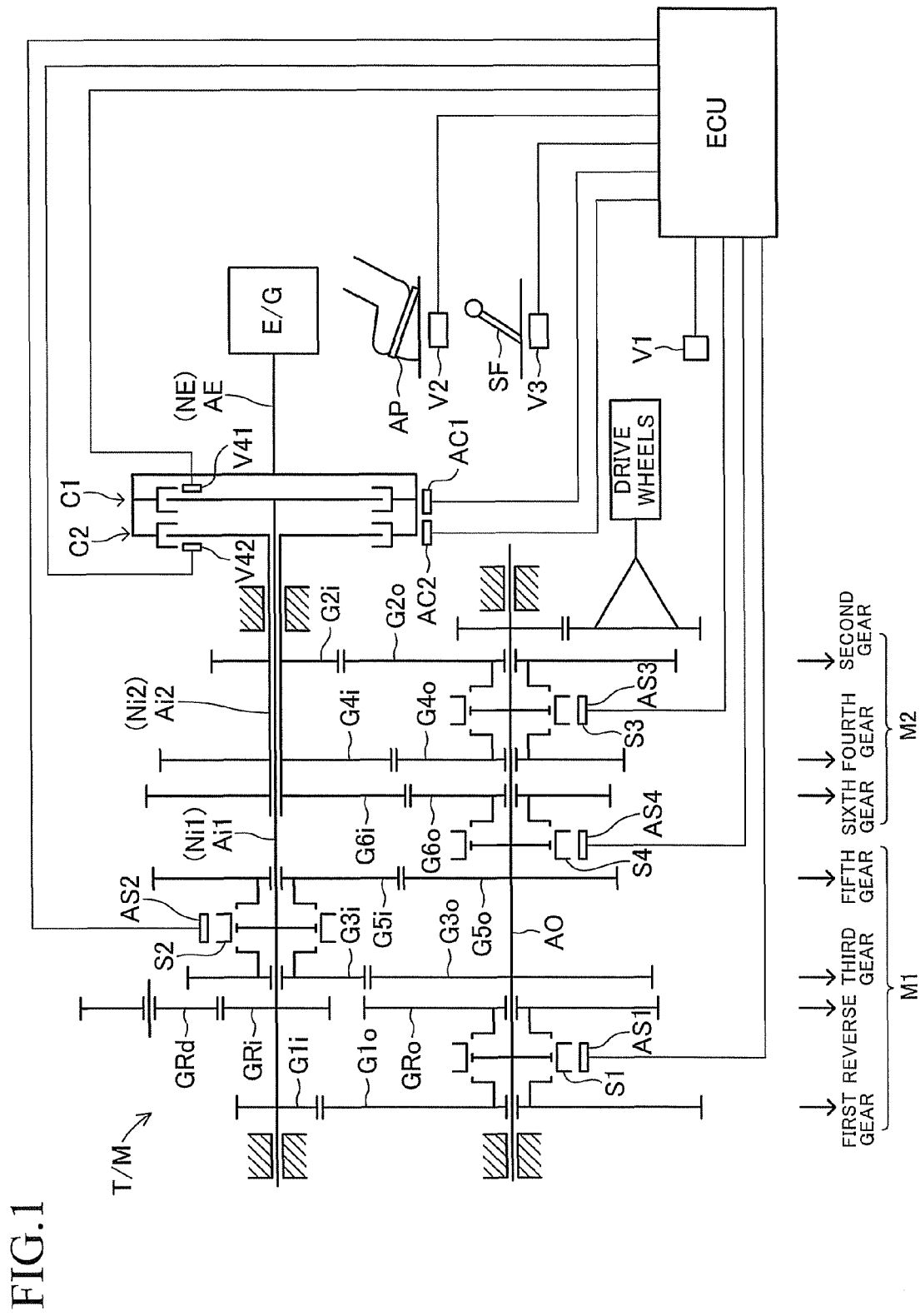
FIG. 1 is a schematic diagram of a power transmission control apparatus according to an embodiment of the present invention.

The sleeve S1 is always in spline engagement with a hub which rotates unitarily with the output shaft AO such that the sleeve S1 can move in the axial direction. When the sleeve S1 is located at the position (non-connected position) shown in FIG. 1, the sleeve S1 spline-engages with neither a first-gear piece which rotates unitarily with the driven gear G1o nor a reverse piece which rotates unitarily with the driven gear GRo. When the sleeve S1 moves from the non-connected position to a left-hand-side position (first-gear position), the sleeve S1 spline-engages with the first-gear piece. When the sleeve S1 moves from the non-connected position to a right-hand-side position (reverse position), the sleeve S1 spline-engages with the reverse piece.

The sleeve S2 is always in spline engagement with a hub which rotates unitarily with the first input shaft Ai1 such that the sleeve 82 can move in the axial direction. When the sleeve 82 is located at the position (non-connected position) shown in FIG. 1, the sleeve S2 spline-engages with neither a third-gear piece which rotates unitarily with the drive gear G3i nor a fifth-gear piece which rotates unitarily with the drive gear G5i. When the sleeve S2 moves from the non-connected position to a left-hand-side position (third-gear position), the sleeve S2 spline-engages with the third-gear piece. When the sleeve S2 moves from the non-connected position to a right-hand-side position (fifth-gear position), the sleeve S2 spline-engages with the fifth-gear piece.

By virtue of the above-described configuration, in the first mechanism section Ml, when both the sleeves S1 and S2 are maintained at their non-connected positions, there can be established a neutral state in which no power transmission system is formed between the first input shaft Ai1 and the output shaft AO. When the sleeve S1 moves to the first-gear position in the neutral state, a power transmission system having a first-gear speed reduction ratio is formed (first gear is established). When the sleeve SI moves to the reverse position in the neutral state, a power transmission system having a reverse speed reduction ratio is formed (reverse is established). When the sleeve S2 moves to the third-gear position in the neutral state, a power transmission system having a third-gear speed reduction ratio is formed (third gear is established). When the sleeve S2 moves to the fifth-gear position in the neutral state, a power transmission system having a fifth-gear speed reduction ratio is formed (fifth gear is established).

The second mechanism section M2 includes a second-gear drive gear G2i and a second-gear driven gear G2o, which are in meshing engagement with each other at all times; a fourth-gear drive gear G4i and a fourth-gear driven gear G4o, which are in meshing engagement with each other at all times; a sixth-gear drive gear G6i and a sixth-gear driven gear G6o, which are in meshing engagement with each other at all times; and sleeves S3, S4. The sleeves S3, S4 are driven by sleeve actuators AS3, AS4, respectively.

All the drive gears G2i, G4i, and G6i are fixed to the second input shaft Ai2 for unitary rotation therewith. All the driven gears G2o, G4o, and G6o are supported by the output shaft AO such that they can rotate relative to the output shaft AO.

The sleeve S3 is always in spline engagement with a hub which rotates unitarily with the output shaft AO such that the sleeve S3 can move in the axial direction. When the sleeve S3 is located at the position (non-connected position) shown in FIG. 1, the sleeve S3 spline-engages with neither a second-gear piece which rotates unitarily with the driven gear G2o nor a fourth-gear piece which rotates unitarily with the driven gear G4o. When the sleeve 83 moves from the non-connected position to a right-hand-side position (second-gear position), the sleeve S3 spline-engages with the second-gear piece. When the sleeve S3 moves from the non-connected position to a left-hand-side position (fourth-gear position), the sleeve S3 spline-engages with the fourth-gear piece.

The sleeve S4 is always in spline engagement with a hub which rotates unitarily with the output shaft AO such that the sleeve S4 can move in the axial direction. When the sleeve S4 is located at the position (non-connected position) shown in FIG. 1, the sleeve S4 does not spline-engage with a sixth-gear piece which rotates unitarily with the driven gear G6o. When the sleeve S4 moves from the non-connected position to a right-hand-side position (sixth-gear position), the sleeve S4 spline-engages with the sixth-gear piece.

By virtue of the above-described configuration, in the second mechanism section M2, when the sleeves S3 and S4 are maintained at their non-connected positions, there can be established a neutral state in which no power transmission system is formed between the second input shaft Ai2 and the output shaft AO. When the sleeve S3 moves to the second-gear position in the neutral state, a power transmission system having a second-gear speed reduction ratio is formed (second gear is established). When the sleeve S3 moves to the fourth-gear position in the neutral state, a power transmission system having a fourth-gear speed reduction ratio is formed (fourth speed is established). When the sleeve S4 moves to the sixth-gear position in the neutral state, a power transmission system having a sixth-gear speed reduction ratio is formed (sixth gear is established).

Figure 2:
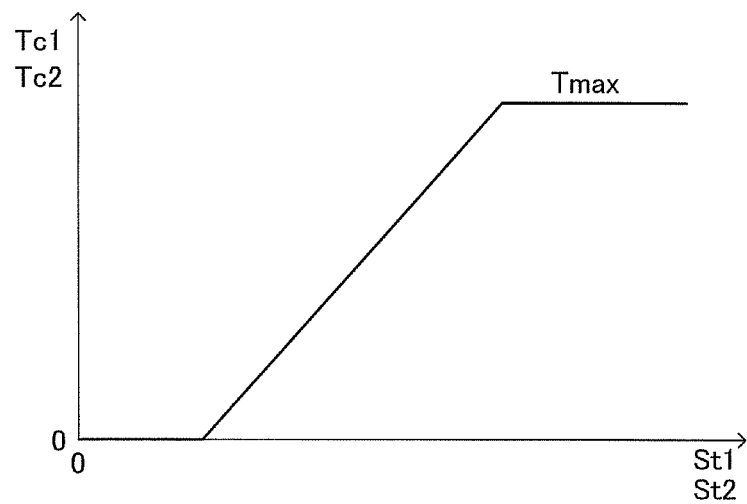
FIG. 2 is a graph showing the relation between clutch stroke and clutch torque of clutches shown in FIG. 1.

The first and second clutches C1, C2 are coaxially disposed in series in the axial direction. A clutch actuator AC1 adjusts the clutch stroke St1 of the first clutch C1. As shown in FIG. 2, through adjustment of the clutch stroke St1, the maximum torque which the first clutch C1 can transfer (first clutch torque Trc1) can be adjusted. In a state in which Trc1=0, a power transmission system is not formed between the output shaft AE of the engine E/G and the first input shaft Ai1. This state will be referred to as a "disengaged state." In a state in which Trc1>0, a power transmission system is formed between the output shaft AE of the engine E/G and the first input shaft Ai1. This state will be referred to as an "engaged state." Notably, the term "clutch stroke" means the amount of movement of a friction member driven by the clutch actuator, from the original position (clutch stroke=0) toward a pressing direction (a direction for increasing the clutch torque).

Similarly, a clutch actuator AC2 adjusts the clutch stroke St2 of the second clutch C2. As shown in FIG. 2, through adjustment of the clutch stroke St2, the maximum torque which the second clutch C2 can transfer (second clutch torque Trc2) can be adjusted. For the second clutch C2, a "disengaged state" and an "engaged state" are defined in the same manner as those for the first clutch C1. Specifically, the clutch torque is adjusted as follows. First, a target clutch stroke is determined on the basis of a (target) clutch torque to be achieved and a map which defines the relation between clutch stroke and clutch torque (stroke-torque characteristic) (see FIG. 2). The clutch actuator is controlled such that the actual clutch stroke coincides with the target clutch stroke. With this control, the actual clutch torque is adjusted to coincide with the target clutch torque.

Also, the present apparatus includes a wheel speed sensor V1 for detecting wheel speeds of the wheels of the vehicle; an accelerator opening sensor V2 for detecting an amount by which an accelerator pedal AP is operated (accelerator opening); a shift position sensor V3 for detecting the position of a shift lever SF; and temperature sensors V41, V42 for detecting the temperatures of the first and second clutches C1, C2, respectively.

Moreover, the present apparatus includes the electronic control unit ECU. The ECU controls the gear of the transmission T/M and the states of the first and second clutches C1, C2 by controlling the clutch actuators AC1, AC2 and the sleeve actuators AS1 to AS4 on the basis of information from the above-described sensors V1 to V3, V41, and V42, and other information. As described above, the present apparatus is a power transmission apparatus using a double clutch transmission (DCT).

Figure 3:
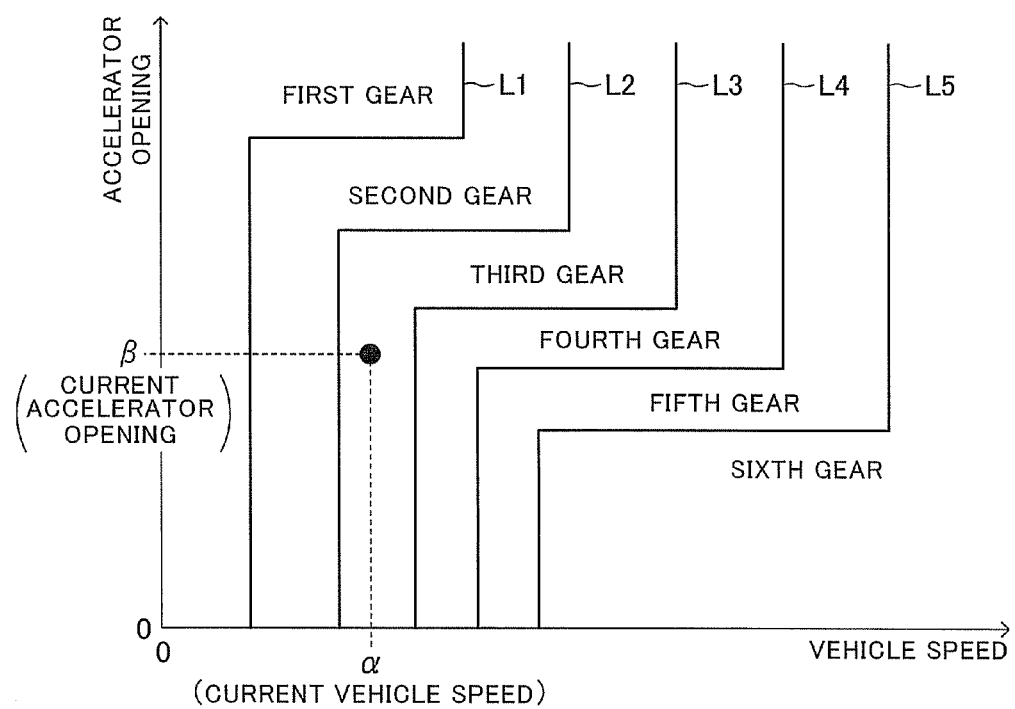
FIG. 3 is a graph showing a gear-shift map which represents a previously determined relation between "to-be-achieved gear of a transmission" and "combination between vehicle speed and accelerator opening," and which is referred by an ECU shown in FIG. 1.

Ordinary Control:

In the present apparatus, when the shift lever SF is located at a position corresponding to an "automatic mode," the gear of the transmission T/M is determined on the basis of a gear-shift map, which is shown in FIG. 3 and which is stored in ROM (not shown) of the ECU. More specifically, in the present apparatus, a gear to be achieved (hereinafter referred to as a "selected gear") is selected on the basis of a gear region which corresponds to the combination between a vehicle speed calculated from the wheel speeds obtained from the wheel speed sensor V1 and an accelerator opening obtained from the accelerator opening sensor V2. For example, in the case where the current vehicle speed is α and the current accelerator opening is β (see a black dot shown in FIG. 3), "third gear" is selected as the selected gear.

The gear-shift map shown in FIG. 3 can be obtained by repeatedly performing an experiment for selecting the optimum gear for the combination of vehicle speed and accelerator opening, while changing the combination in various ways. This gear-shift map is stored in the ROM of the ECU. Notably, in the case where the shift lever SF is located at a position corresponding to a "manual mode," the selected gear is selected on the basis of a driver's operation of the shift lever SF.

In the following description, in order to facilitate description and understanding, the system constituted by the first clutch C1, the first input shaft Ai1, and the first mechanism section M1 will be called the "first system"; and the system constituted by the second clutch C2, the second input shaft Ai2, and the second mechanism section M2 will be called the "second system." Furthermore, of the first and second mechanism sections M1, M2, the first and second clutches C1, C2, the first and second input shafts Ai1, Ai2, and the first and second systems, those corresponding to the selected gear will be referred to as the "selected mechanism section," the "selected clutch," the "selected input shaft," and the "selected system"; and those not corresponding to the selected gear will be referred to as the "unselected mechanism section," the "unselected clutch," the "unselected input shaft," and the "unselected system."

As described above, in this transmission T/M, odd gears including first gear (first gear, third gear, and fifth gear) are selectively established in the first mechanism section M1, and even gears including second gear (second gear, fourth gear, and sixth gear) are selectively established in the second mechanism section M2. Accordingly, the states of the first and second systems are reciprocally switched between the selected and unselected states every time the selected gear is changed from the current gear to an adjacent higher gear (upshift) or the selected gear is changed from the current gear to an adjacent lower gear (downshift).

Once the selected gear is selected with reference to the gear-shift map, in a state in which the selected gear is established in the selected mechanism section, the selected clutch is controlled into the engaged state, and the unselected clutch is controlled into the disengaged state. The clutch torque of the selected clutch in the engaged state can be set to an arbitrary value within a range in which the clutch torque is greater than the drive torque (engine torque) of the engine E/G (that is, within a range in which slippage does not occur in the selected clutch). For example, the clutch torque of the selected clutch in the engaged state may be adjusted to the maximum value Tmax (see FIG. 2) or a value which is greater than the engine torque by a certain amount.

With this operation, a power transmission system having a speed reduction ratio of the selected gear is formed between the output shaft AE of the engine E/G and the output shaft AO of the transmission T/M via the selected system. Accordingly, the engine torque can be transmitted to the drive wheels via the selected system.

Meanwhile, in the unselected system, the unselected clutch is in the disengaged state (clutch torque=0). Accordingly, the unselected mechanism section can be caused to wait in a state in which a gear, which will become the selected gear next, (specifically, a higher or lower gear adjacent to the current selected gear), has been established. Specifically, in the case where the current selected gear is "third gear" (that is, the first mechanism section M1 is the selected mechanism section), the second mechanism section M2, which is an unselected mechanism section, can be caused to wait in a state in which "fourth gear" or "second gear" has been established.

In the present apparatus, in accordance with one of known methods, prediction as to whether upshift or downshift will be performed next is performed on the basis of changes in the operation state of the vehicle up to the present (e.g., a change in vehicle speed, a change in engine torque, a change in accelerator opening, etc.). In the case where performance of an upshift is predicted, the unselected mechanism section is caused to wait in a "state in which a higher gear adjacent to the currently selected gear has been established." In the case where performance of a downshift is predicted, the unselected mechanism section is caused to wait in a "state in which a lower gear adjacent to the currently selected gear has been established."

In addition, in the present apparatus, when the selected gear is changed; i.e., an upshift or a downshift is performed, because of a change in the state of the vehicle (combination of vehicle speed and accelerator opening), an operation of changing the state of one of the first and second clutches from the engaged state to the disengaged state and an operation of changing the state of the other clutch from the disengaged state to the engaged state (i.e., an "operation of changing the state of the engaged clutch to the disengaged state" and an "operation of changing the state of the disengaged clutch to the engaged state") are executed at the same time. As a result, in the case where an upshift or a downshift is performed, engine torque can be continuously transmitted, without interruption, to the output shaft AE of the transmission T/M (according, to the drive wheels). As a result, gear shift shock can be reduced. In the above, ordinary control performed by the present apparatus has been described.

Start Control:

In the present apparatus, when the vehicle starts, in place of the above-described ordinary control, a control (start control) for starting the vehicle is executed. In the following description, in order to facilitate description and understanding, a clutch used for driving (starting) the vehicle during the start control will be called a "start clutch." Also, an engaged state of each clutch in which slippage is involved will be referred to as a "half-engaged state," and an engaged state of each clutch in which no slippage is involved will be referred to as a "full-engaged state." At the time of start of the vehicle, the "half-engaged state" occurs when the clutch torque is smaller than the engine torque, and the "full-engaged state" occurs when the clutch torque is greater than the engine torque.

In the start control, in a state in which the vehicle is stopped, either one or both of the first and second clutches C1, C2 are selected to be used as the start clutch, on the basis of the temperature of the first clutch C1. When the brake pedal (not shown) is released or the accelerator pedal AP is stepped on, a clutch which is not the start clutch is maintained in the disengaged state, and the clutch torque of the start clutch (one or two clutches used as the start clutch) is adjusted so as to bring the start clutch into the half-engaged state.

The start control is continued until the state of the start clutch changes from the half-engaged stat to the full-engaged state. After that point in time, the above-described ordinary control is started. During the start control, the total clutch torque of the start clutch is adjusted every moment on the basis of a "rotational speed deviation" obtained by subtracting an "engine rotational speed in an idle state" from the current engine rotational speed (rotational speed of the output shaft AE of the engine E/G).

Specifically, the greater the rotational speed deviation, the greater the value to which the total clutch torque of the start clutch is set. In the case where a single clutch is used as the start clutch, the total clutch torque of the start clutch is the clutch torque of the single clutch. In the case where two clutches are used as the start clutch, the total clutch torque of the start clutch is the sum of the clutch torques of the two clutches. Next, processing for selecting a clutch(es) as the start clutch will be described specifically with reference to a flowchart shown in FIG. 4.

The present apparatus (ECU) first determines in step 405 whether or not the temperature of the first clutch C1 is lower than a first temperature T1. The temperature of the first clutch C1 is obtained from the temperature sensor V41. When the temperature of the first clutch C1 is lower than the first temperature T1 ("Yes" in step 405), in step 410, the present apparatus uses only the first clutch C1 as the start clutch, to thereby start the vehicle.

Specifically, in a state in which "first gear" is established in the first mechanism section M1, the first clutch C1 is brought into the half-engaged state, and the second clutch C2 is brought into the disengaged state. In the second mechanism section M2, "second gear" may or may not be established. After the state of the first clutch C1 changes from the half-engaged state to the full-engaged state, the above-described ordinary control is started. That is, an ordinary control in which "first gear" is selected as the selected gear is started.

When the temperature of the first clutch C1 is equal to or higher than the first temperature T1 ("No" in step 405), the present apparatus determines in step 415 whether or not the temperature of the first clutch C1 is lower than a second temperature T2 (>T1). When the temperature of the first clutch C1 is lower than the second temperature T2; that is, when the temperature of the first clutch C1 is not lower than T1 but is lower than T2 ("Yes" in step 415), in step 420, the present apparatus uses the first and second clutches C1, C2 as the start clutch, to thereby start the vehicle.

Specifically, in a state in which "first gear" and "second gear" are established in the first and second mechanism sections M1, M2, respectively, each of the first and second clutches C1, C2 is brought into the half-engaged state. Subsequently, before the state of the first clutch C1 changes from the half-engaged state to the full-engaged state, the state of the second clutch C2 is changed from the half-engaged state to the disengaged state. This will be described in detail later. That is, in this case as well, after the state of the first clutch C1 changes from the half-engaged state to the full-engaged state, the ordinary control in which "first gear" is selected as the selected gear is started.

When the temperature of the first clutch C1 is equal to or higher than the second temperature 12 ("No" in step 415), in step 425, the present apparatus uses only the second clutch C2 as the start clutch, to thereby start the vehicle.

Specifically, in a state in which "second gear" is established in the second mechanism section M2, the second clutch C2 is brought into the half-engaged state, and the first clutch C1 is brought into the disengaged state. In the first mechanism section M1, "first gear" may or may not be established. After the state of the second clutch C2 changes from the half-engaged state to the full-engaged state, the ordinary control in which "second gear" is selected as the selected gear is started.

In the case where both the first and second clutches C1, C2 are used (step 420; a region in which the temperature of the first clutch C1 is not lower than T1 but is lower than T2), the ratio (hereinafter called the "second clutch torque distribution ratio") of the clutch torque of the second clutch C2 to the sum of the clutch torques of the first and second clutches C1, C2 (=the total clutch torque of the start clutch) is determined in accordance with a map shown in FIG. 5. That is, the higher the temperature of the first clutch C1, the greater the value to which the second clutch torque distribution ratio is set.

Figure 5:
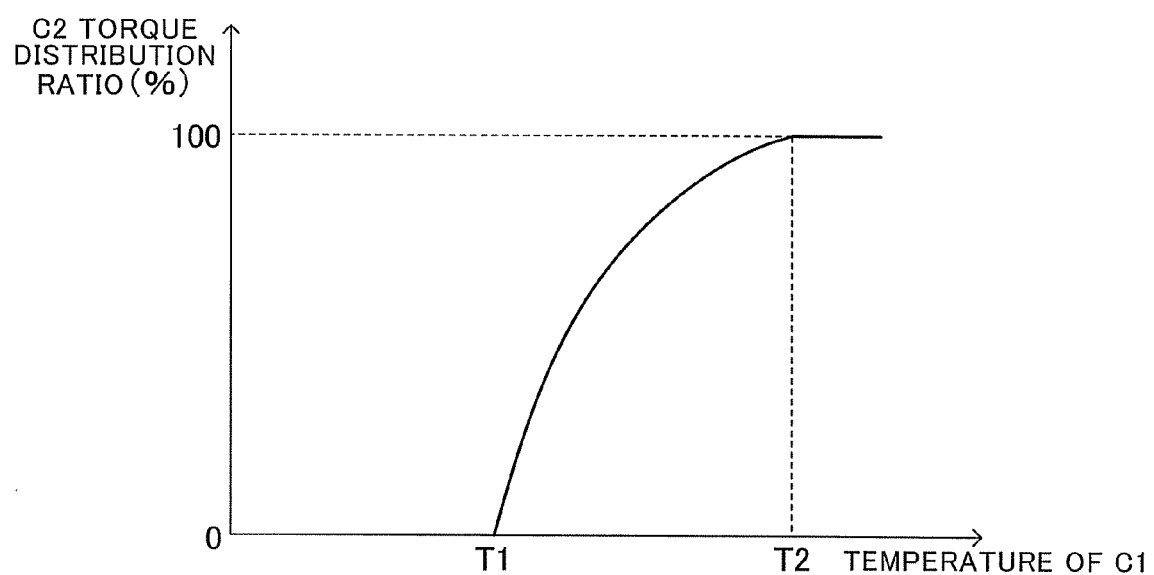
FIG. 5 is a graph showing a map which defines the relation between temperature of the first clutch and second clutch torque distribution ratio, and which is referred by the ECU shown in FIG. 1.

With this operation, as shown in FIG. 5, the second clutch torque distribution ratio can be continuously changed from a region where the temperature of the first clutch C1 is lower than T1 (step 410; that is, the second clutch torque distribution ratio=0%) to a region where the temperature of the first clutch C1 is equal to or higher than T2 (step 425; that is, the second clutch torque distribution ratio=100%).

Figure 11:
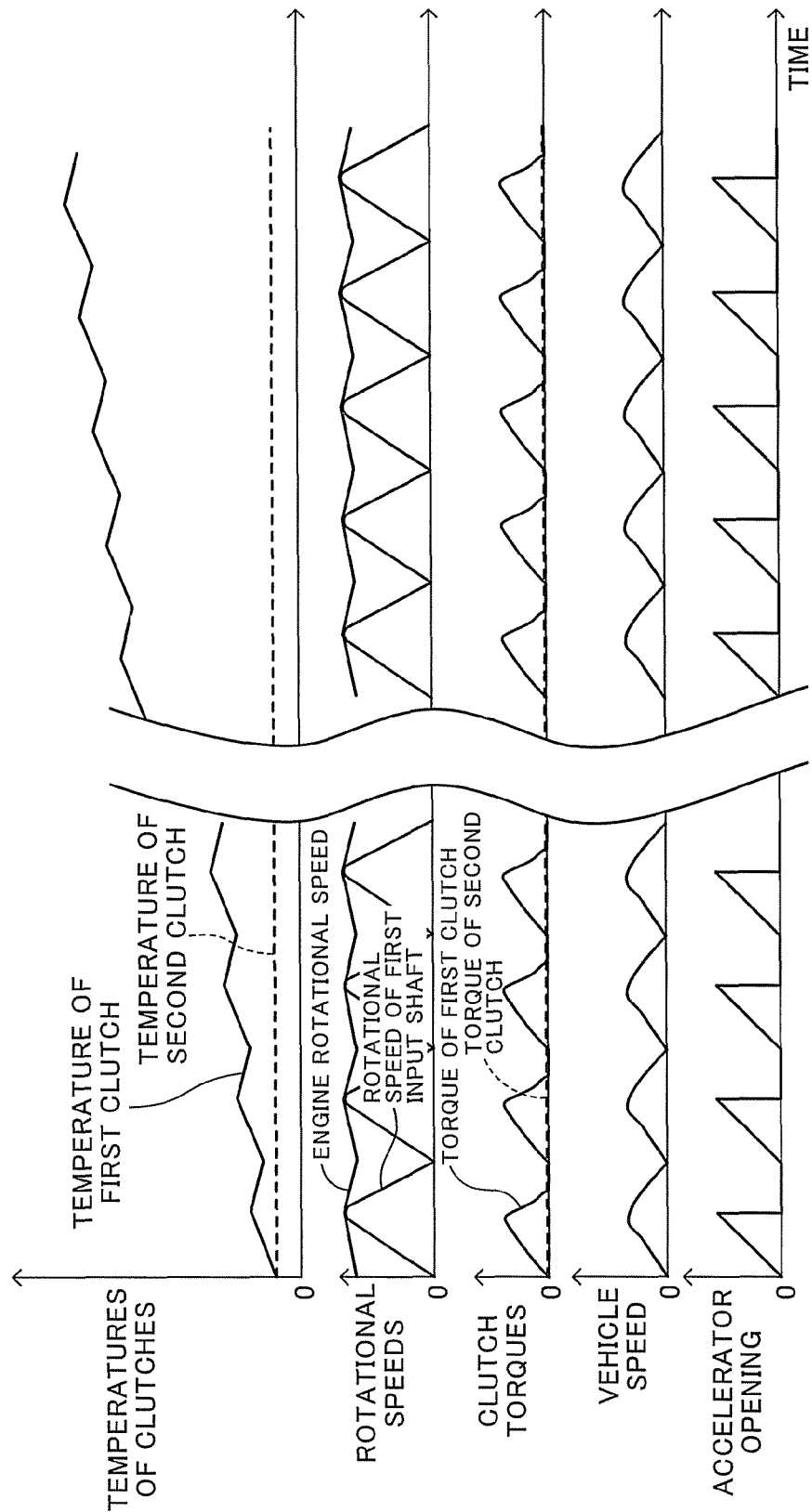
FIG. 11 is a time chart showing an example situation where a vehicle on which a conventional power transmission control apparatus is mounted repeatedly starts and stops on a congested, long uphill.

By virtue of the above-described processing, in addition to or in place of the first clutch C1, the second clutch C2 is used as the start clutch in accordance with the temperature of the first clutch C1. Accordingly, the second clutch C2 bears a portion or the entirety of a load which the start clutch receives when the vehicle starts. As a result, as compared with the conventional apparatus shown in FIG. 11 (the case where only the first clutch is used as the start clutch), the load acting on the first clutch C1 decreases. As a result, there can be prevented occurrence of a situation in which the temperature of the first clutch C1 increases excessively.

Figure 4:
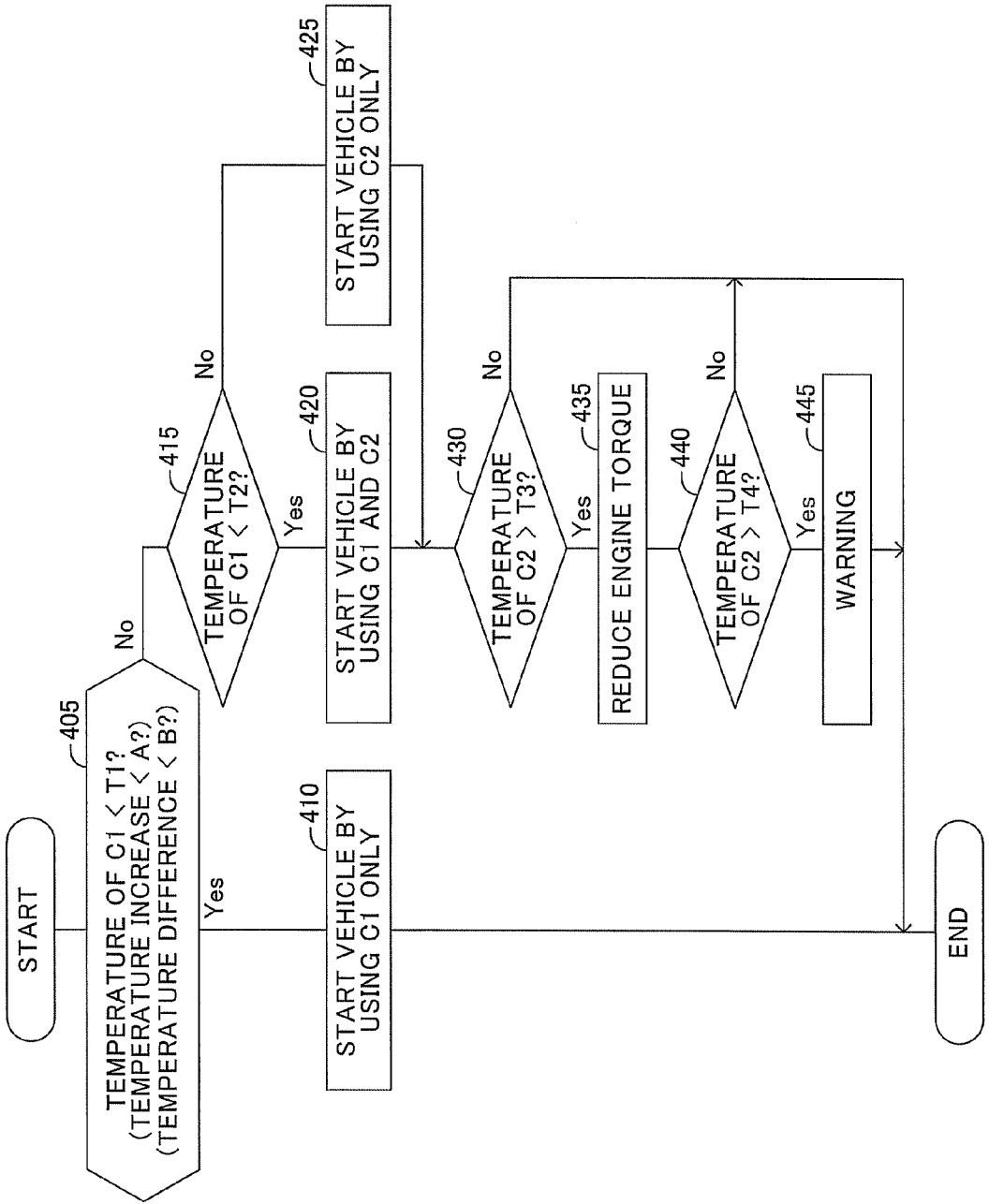
FIG. 4 is a flowchart showing processing for selection of a start clutch, etc., which is executed by the ECU shown in FIG. 1.

In place of the "condition of the temperature of the first clutch C1 being lower than the first temperature T1," the "condition that a temperature increase of the first clutch C1 within a predetermined time is less than a first predetermined value A" may be used as the judgment condition of step 405 of FIG. 4. This is based on the view that, even in the case where the current temperature of the first clutch C1 is relatively low (lower than the first temperature T1), when the temperature increase of the first clutch C1 within the predetermined time is large, the temperature of the first clutch C1 is highly likely to increase (become equal to or higher than the first temperature T1) after a short period of time.

Figure 6:
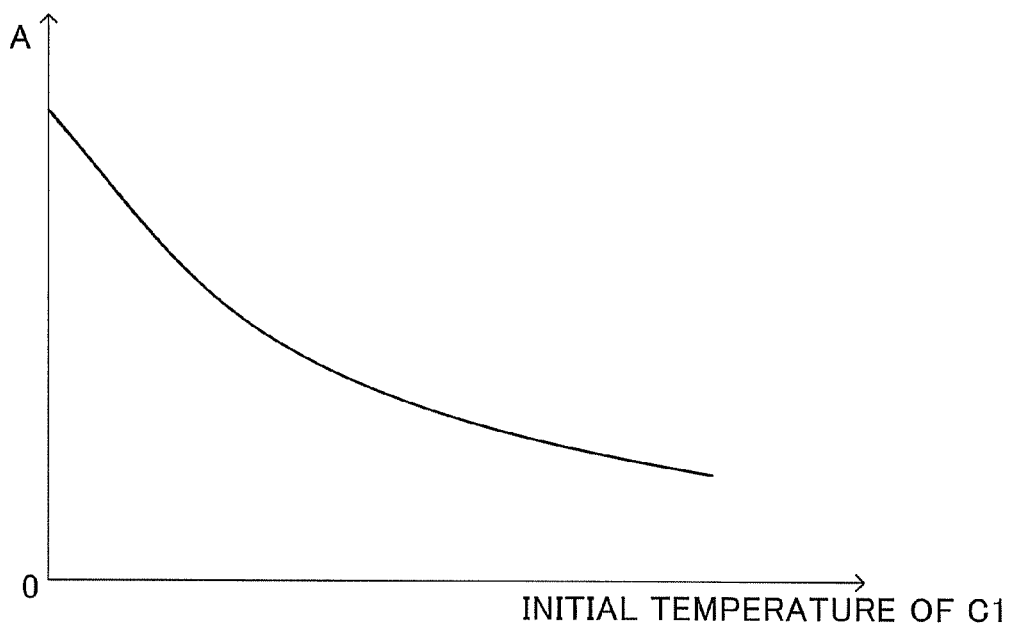
FIG. 6 is a graph showing a map which defines the relation between initial temperature of the first clutch and a first predetermined value, and which is referred by the ECU shown in FIG. 1.

A constant time may be employed as the predetermined time, or a time which changes in accordance with the temperature of the first clutch C1 may be employed as the predetermined time. As shown in FIG. 6, the first predetermined value A is determined on the basis of the temperature of the first clutch C1 at the beginning of the predetermined time (hereinafter referred to as the "initial temperature"). Specifically, the higher the initial temperature of the first clutch C1, the smaller the first predetermined value A. This is based on the view that the higher the initial temperature of the first clutch C1, the greater the possibility that the temperature of the first clutch C1 becomes equal to or higher than the first temperature T1.

Preferably, the temperature of the first clutch C1 obtained in a state in which the vehicle speed is equal to or less than a predetermined vehicle speed is employed as the initial temperature. The initial temperature determined in this manner may be updated. Specifically, every time the "temperature increase of the first clutch C1 within the predetermined time"

is determined to be less than the first predetermined value A, the initial temperature is updated to a temperature equal to the temperature of the first clutch C1 at that time.

Instead of the "condition of the temperature of the first clutch C1 being lower than the first temperature T1," the "condition that a temperature difference obtained by subtracting the temperature of the second clutch C2 from that of the first clutch C1 is less than a second predetermined value B" may be used as the judgment condition of step 405 of FIG. 4. This is based on the view that, even in the case where the current temperature of the first clutch C1 is relatively low (lower than the first temperature T1), when the temperature difference is large, the temperature of the first clutch C1 is highly likely to increase (become equal to or higher than the first temperature T1) after a short period of time. Notably, the temperature of the second clutch C2 can be obtained from the temperature sensor V42.

Figure 7:
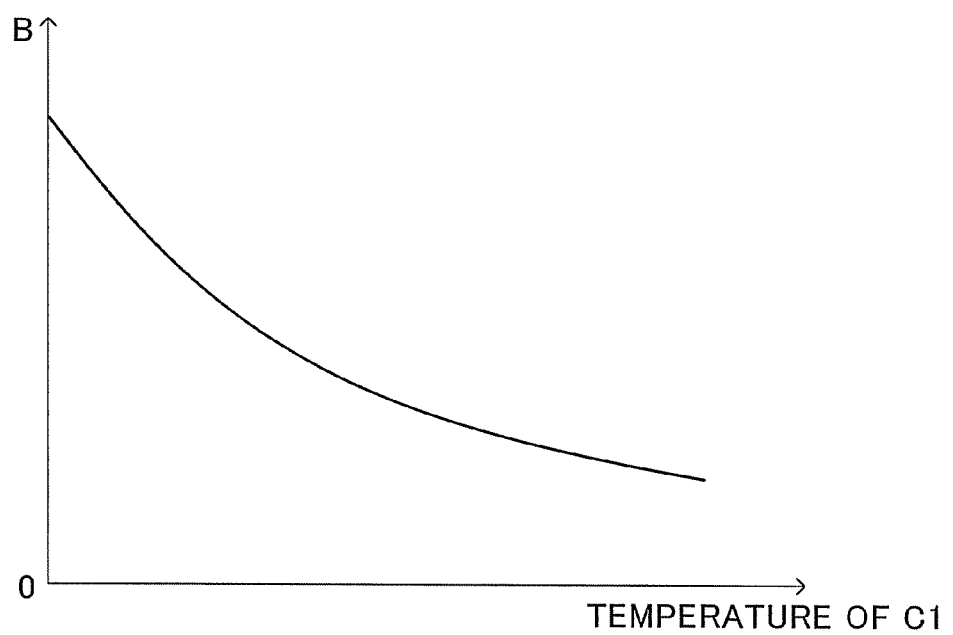
FIG. 7 is a graph showing a map which defines the relation between temperature of the first clutch and a second predetermined value, and which is referred by the ECU shown in FIG. 1.

As shown in FIG. 7, the second predetermined value B is determined on the basis of the temperature of the first clutch C1. Specifically, the higher the temperature of the first clutch C1, the smaller the second predetermined value B. This is based on the view that the higher the temperature of the first clutch C1, the greater the possibility that the temperature of the first clutch C1 becomes equal to or higher than the first temperature T1.

Figure 8:
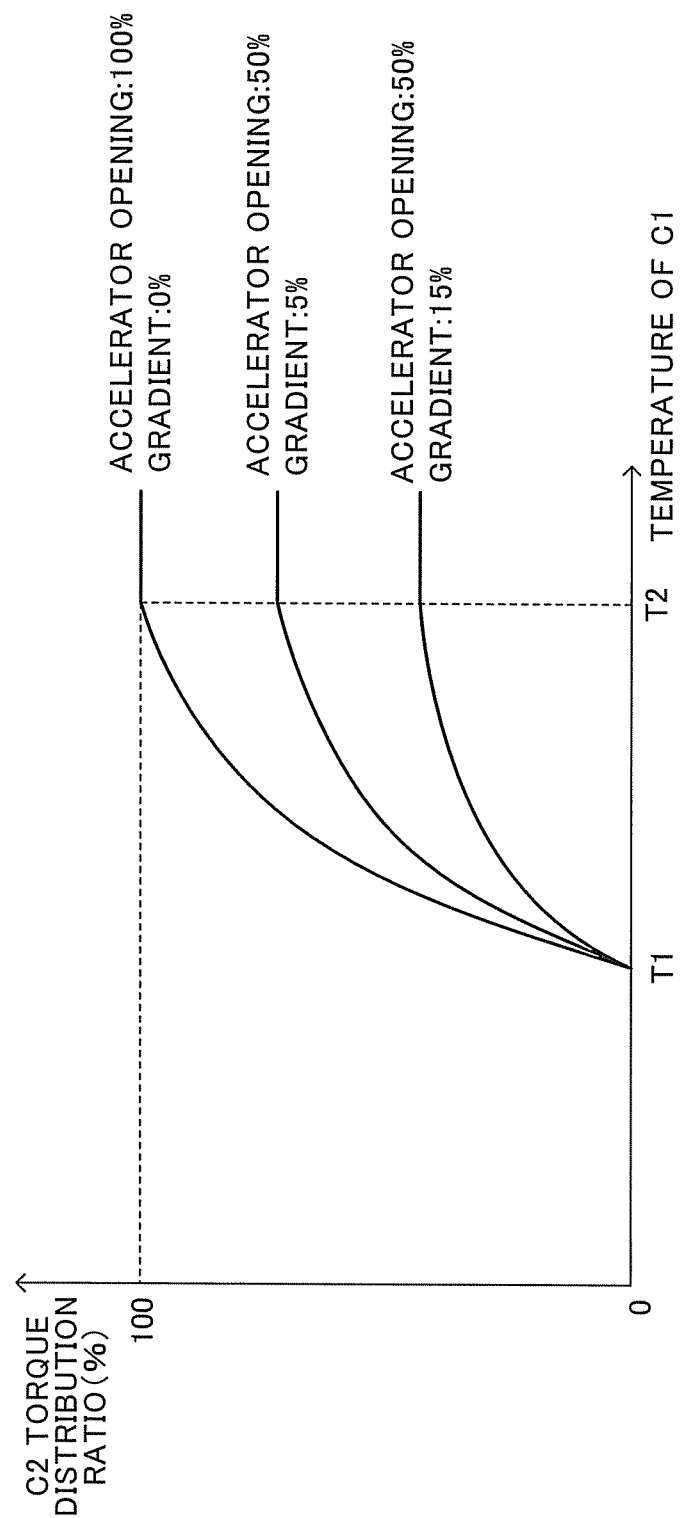
FIG. 8 is a graph showing a map which defines the relation between second clutch torque distribution ratio and combination among temperature of the first clutch, accelerator opening, and road surface gradient, and which is referred by the ECU shown in FIG. 1.

In place of the map shown in FIG. 5, a map shown in FIG. 8 may be used for determining the second clutch torque distribution ratio. In this case, the following action and effect can be attained. First, the higher the temperature of the first clutch C1, the greater the value to which the second clutch torque distribution ratio is set. Thus, the higher the temperature of the first clutch C1, the smaller the load acting on the first clutch C1.

Second, the greater the accelerator opening, the greater the value to which the second clutch torque distribution ratio is set. Thus, the greater the load acting on the entire start clutch, the smaller the ratio of the load acting on the first clutch C1. As a result, the occurrence of a situation in which the temperature of the first clutch C1 increases excessively can be prevented more reliably.

Third, the greater the gradient of an uphill road on which the vehicle starts, the smaller the value to which the second clutch torque distribution ratio is set. As a result, the clutch torque of the first clutch C1 is increased. As compared with the second system in which "second gear" is established, the first system in which "first gear" is established can provide a larger drive torque to the vehicle. By virtue of the above-described processing, the greater the uphill gradient, the greater the drive torque which can be provided to the vehicle. As a result, on an uphill road having a large gradient, the vehicle can be started with a sufficiently large drive force.

The description of the case where both the first and second clutches C1, C2 are used as the start clutch (step 420) and the description of the case where only the second clutch C2 is used as the start clutch (step 425) will be continued with reference to FIG. 4. These cases correspond to the case where the temperature of the first clutch C1 is equal to or higher than the first temperature T1.

When the processing of step 420 or step 425 is executed, the present apparatus determines in step 430 whether or not the temperature of the second clutch C2 is higher than a third temperature T3. When the temperature of the second clutch C2 is higher than T3 ("Yes" in step 430), in step 435, the present apparatus decreases the engine torque from the current value (that is, the value corresponding to the accelerator opening).

This processing is based on the following view. That is, using at least the second clutch as the start clutch means that the temperature of the first clutch C1 is sufficiently high (equal to or higher than the first temperature T1). In this case, the fact that the temperature of the second clutch C2 is also high means that the load acting on the entire start clutch is excessively large. Accordingly, in such a case, the load acting on the entire start clutch must be reduced. In order to reduce the load acting on the entire start clutch, reducing the engine torque is effective.

After the determination of step 430, the present apparatus further determines in step 440 whether or not the temperature of the second clutch C2 is higher than a fourth temperature T4, which is higher than the third temperature T3. In the case where the temperature of the second clutch C2 is higher than the fourth temperature T4 ("Yes" in step 440), the present apparatus issues a warning in step 445. Specifically, the present apparatus turns on a warning lamp provided on the vehicle. Alternatively, the present apparatus causes a warning device provided on the vehicle to generate a warning sound. By virtue of this processing, it becomes possible to notify a driver that the clutches must be protected, and prompt the driver to take measures for protecting the clutches, such as stopping the vehicle.

Figure 9:
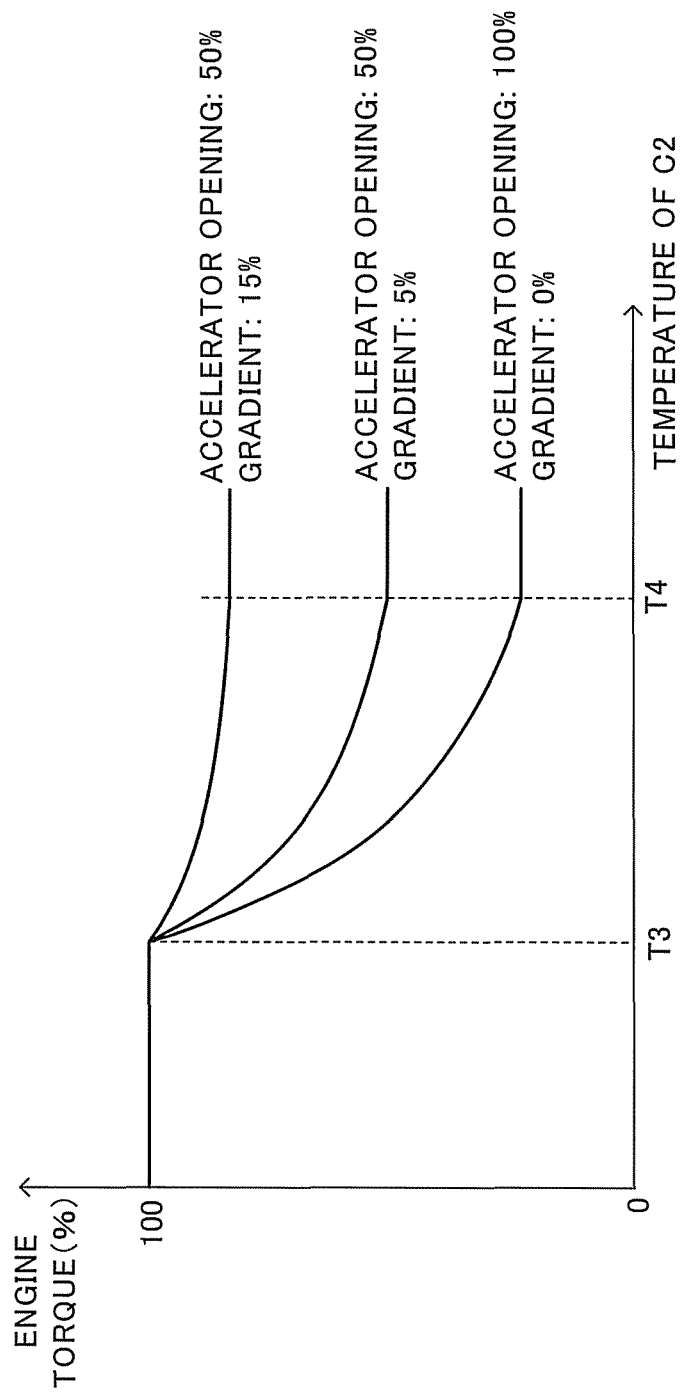
FIG. 9 is a graph showing a map which defines the relation between engine torque reduction ratio and combination among temperature of the second clutch, accelerator opening, and road surface gradient, and which is referred by the ECU shown in FIG. 1.

When the engine torque is reduced in step 435, an engine torque reduction ratio can be determined in accordance with a map shown in FIG. 9. In FIG. 9, "engine torque: 100%" corresponds to "engine torque reduction ratio=0%." Thus, when the temperature of the second clutch C2 is equal to or higher than T3, the following action and effect can be attained. First, the higher the temperature of the second clutch C2, the greater the value to which the engine torque reduction ratio is set. Thus, the higher the temperature of the second clutch C2, the smaller the load acting on the first and second clutches C1, C2. Notably, when the temperature of the second clutch C2 is equal to or higher than T4, the engine torque reduction ratio can be maintained constant irrespective of the temperature of the second clutch C2.

Second, the greater the accelerator opening, the greater the value to which the engine torque reduction ratio is set. Thus, in the case where the load acting on the entire start clutch may increase, the load acting on the first and second clutches C1, C2 can be prevented from increasing. As a result, the occurrence of a situation in which the temperatures of the first and second clutches C1, C2 increase excessively can be prevented more reliably.

Third, the greater the gradient of an uphill road on which the vehicle starts, the smaller the value to which the engine torque reduction ratio is set. Thus, the greater the uphill gradient, the greater the drive torque which can be provided to the vehicle. As a result, on an uphill road having a large gradient, the vehicle can be started with a sufficiently large drive force. In the above, the start control performed by the present apparatus has been described with reference to FIGS. 4 to 9.

Figure 10:
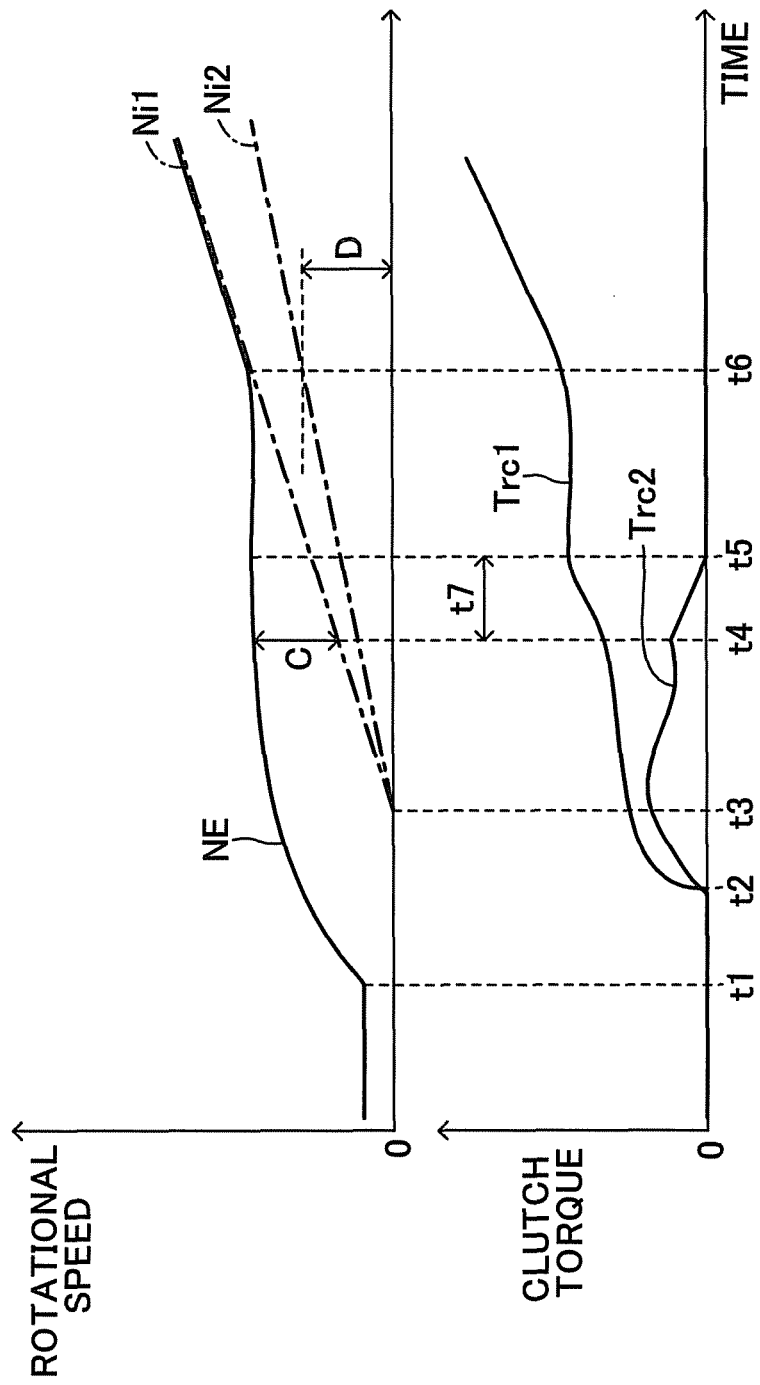
FIG. 10 is a time chart showing an example situation where a vehicle on which the power transmission control apparatus according to the embodiment of the present invention is mounted starts.

FIG. 10 is a time chart showing an example of the above-described start control performed when the vehicle on which the present apparatus is mounted starts. FIG. 10 shows an example in which both the first and second clutches C1, C2 are used as the start clutch. In FIG. 10, NE represents the rotational speed of the engine; Ni1 and Ni2 represent the rotational speeds of the first and second input shafts Ai1, Ai2, respectively; and Trc1 and Trc2 represent the clutch torques of the first and second clutches, respectively.

In this example, at time t1, the brake pedal is released and the accelerator pedal AP stepped on in a state in which the vehicle is stopped. Thus, after time t1, the engine rotational speed NE increases from an idle rotational speed. As a result, after time t2, the clutch torques Trc1, Trc2 of the first and second clutches C1, C2 increase from zero. The clutch torques Trc1, Trc2 are adjusted every moment such that the sum of the clutch torques (Trc1+Trc2) coincides with the above-described "total clutch torque of the start clutch," and the ratio (Trc2/(Trc1+Trc2)) coincides with the second clutch torque distribution ratio obtained from the map shown in FIG. 5 or the map shown in FIG. 8.

After time t2, the engine torque is transmitted to the drive wheels via the first and second systems. As a result, at time t3, the vehicle starts (the vehicle speed changes from zero to a value greater than zero). Thus, after time t3, the rotational speeds Ni1, Ni2 of the first and second input shafts Ai1, Ai2 increase from zero as the vehicle speed increases. The rotational speed Ni1 changes such that it assumes a value determined from the vehicle speed and the speed reduction ratio of "first gear"; and the rotational speed Ni2 changes such that it assumes a value determined from the vehicle speed and the speed reduction ratio of "second gear."

In this example, at time t6, the rotational speed Ni1 of the first input shaft Ai1 becomes equal to the engine rotational speed NE. That is, at time t6, the state of the first clutch C1 changes from the half-engaged state to the full-engaged state. Accordingly, the start control ends at t6. After time t6, the "ordinary control" in which "second gear" is selected as the selected gear is executed.

Furthermore, in this example, the state of the second clutch C2 is changed from the half-engaged state to the disengaged state before time t6. That is, the clutch torque Trc2 of the second clutch C2 is decreased to zero before time t6.

Next, there will be additionally described a timing for starting an operation of changing the state of the second clutch C2 from the half-engaged state to the disengaged state (hereinafter referred to as a "disengaging operation"). In the example shown in FIG. 10, the disengaging operation is started at time t4, at which a rotational speed deviation obtained by subtracting the rotational speed Ni1 of the first input shaft Ai1 from the engine rotational speed NE becomes equal to or less than a predetermined value C after the vehicle has started (after time t3). This disengaging operation ends at time t5; i.e., when a period of time t7 (the time for the disengaging operation) elapses after time t4.

The timing for starting the disengaging operation may also be determined as follows. First, after the vehicle has started, the increase gradients of the rotational speeds Ni1, Ni2 or the increase gradient of the vehicle speed is detected. From this increase gradient(s), there is estimated a value D of the rotational speed Ni2 at a "point in time when the state of the first clutch C1 changes from the half-engaged state to the full-engaged state." From this value D and the above-described increase gradient(s), the "point in time when the state of the first clutch C1 changes from the half-engaged state to the full-engaged state" is estimated. A point in time which is located before the estimated time point by the above-described period of time t7, or a point in time which is located before that time point by a predetermined period of time can be used as the timing for starting the disengaging operation. In this case, the "point in time when the state of the first clutch C1 changes from the half-engaged state to the full-engaged state" may be estimated directly from the above-described increase gradient(s) without estimating the value D.

Furthermore, the timing for starting the disengaging operation may be determined as follows. First, after the vehicle has started, a change in the engine rotational speed NE is detected. From this change, there is estimated the value D of the rotational speed Ni2 at the "point in time when the state of the first clutch C1 changes from the half-engaged state to the full-engaged state." This value D is multiplied by a predetermined positive value smaller than 1 so as to obtain a second value. A point in time when the rotational speed Ni2 exceeds the second value can be used as the timing for starting the disengaging operation.

Notably, during the disengaging operation, the clutch torques Trc1, Trc2 are adjusted every moment such that the sum of the clutch torques (Trc1+Trc2) coincides with the above-described "total clutch torque of the start clutch." That is, during the disengaging operation, while the clutch torque Trc2 is decreased, the clutch torque Trc1 is increased. Moreover, the decrease gradient of the clutch torque Trc2 may be constant or variable.

The present invention is not limited to the above-described embodiment, and various modifications can be employed within the scope of the present invention. For example, in above-described embodiment, the start control is performed as follows. Only the first clutch C1 is used as the start clutch when the temperature of the first clutch C1 is lower than the first temperature T1; both the first and second clutches C1, C2 are used as the start clutch when the temperature of the first clutch C1 is not lower than the first temperature T1 but is lower than the second temperature T2; and only the second clutch C2 is used as the start clutch when the temperature of the first clutch C1 is equal to or higher than the second temperature T2.

The start control may be performed such that only the first clutch C1 is used as the start clutch when the temperature of the first clutch C1 is lower than a predetermined temperature, and both the first and second clutches C1, C2 are used as the start clutch when the temperature of the first clutch C1 is equal to or higher than the predetermined temperature. Alternatively, the start control may be performed such that only the first clutch C1 is used as the start clutch when the temperature of the first clutch C1 is lower than a predetermined temperature, and only the second clutch C2 is used as the start clutch when the temperature of the first clutch C1 is equal to or higher than the predetermined temperature.

What is claimed is:

1. A power transmission control apparatus for a vehicle comprising:

a transmission which includes a first input shaft for receiving power from a drive source of a vehicle, a second input shaft for receiving power from the drive source, an output shaft for outputting power to drive wheels of the vehicle, a first mechanism section which selectively establishes any one of a plurality of gears or one gear, including first gear and being a portion of all the gears to thereby form a power transmission system between the first input shaft and the output shaft, and a second mechanism section which selectively establishes any one of a plurality of gears or one gear, including second gear and being the remaining gear(s) to thereby form a power transmission system between the second input shaft and the output shaft;

a first clutch which selectively achieves an engaged state so as to form a power transmission system between the output shaft of the drive source and the first input shaft or a disengaged state so as to cut off the power transmission system and which can adjust a clutch torque that is the maximum torque which can be transmitted by the first clutch in the engaged state;

a second clutch which selectively achieves an engaged state so as to form a power transmission system between the output shaft of the drive source and the second input shaft or a disengaged state so as to cut off the power transmission system and which can adjust a clutch torque that is the maximum torque which can be transmitted by the second clutch in the engaged state; and control means for selecting one gear as a selected gear on the basis of a movement of a shift operation member of the vehicle and/or a traveling state of the vehicle, for controlling a mechanism section selected from the first and second mechanism sections and corresponding to the selected gear so as to establish the selected gear, for controlling, in this state, a clutch selected from the first and second clutches and corresponding to the selected mechanism section so as to bring the selected clutch into the engaged state, and for controlling an unselected clutch different from the selected clutch so as to bring the unselected clutch into the disengaged state, wherein, when the vehicle starts, the control means selects either one or both of the first and second clutches as a start clutch used for driving the vehicle, and adjusts the clutch torque(s) of the selected clutch(es) so as to bring the selected clutch(es) into a half-engaged state, which is an engaged state in which slippage is involved, to thereby start the vehicle.

2. A power transmission control apparatus for a vehicle according to claim 1, wherein the control means selects either one or both of the first and second clutches as the start clutch on the basis of a temperature state of the first clutch.

3. A power transmission control apparatus for a vehicle according to claim 2, wherein, when the vehicle starts, the control means operates in such a manner that, when a temperature of the first clutch is lower than a first temperature, the control means controls the first clutch into the half-engaged state and the second clutch into the disengaged state in a state in which the first gear is established in the first mechanism section; and, when the temperature of the first clutch is equal to or higher than the first temperature, the control means controls each of the first and second clutches into the half-engaged state in a state in which the first and second gears are established in the first and second mechanism sections, respectively, or controls the second clutch into the half-engaged state and the first clutch into the disengaged state in a state in which the second gear is established in the second mechanism section.

4. A power transmission control apparatus for a vehicle according to claim 3, wherein, when the vehicle starts, the control means operates in such a manner that, when the temperature of the first clutch is not lower than the first temperature but is lower than a second temperature higher than the first temperature, the control means controls each of the first and second clutches into the half-engaged state in a state in which the first and second gears are established in the first and second mechanism sections, respectively; and, when the temperature of the first clutch is equal to or higher than the second temperature, the control means controls the second clutch into the half-engaged state and the first clutch into the disengaged state in a state in which the second gear is established in the second mechanism section.

5. A power transmission control apparatus for a vehicle according to claim 2, wherein, when the vehicle starts, the control means operates in such a manner that, when a temperature increase of the first clutch within a predetermined time is less than a first predetermined value, the control means controls the first clutch into the half-engaged state and the second clutch into the disengaged state in a state in which the first gear is established in the first mechanism section; and, when the temperature increase is equal to or greater than the first predetermined value, the control means controls each of the first and second clutches into the half-engaged state in a state in which the first and second gears are established in the first and second mechanism sections, respectively, or controls the second clutch into the half-engaged state and the first clutch into the disengaged state in a state in which the second gear is established in the second mechanism section.

6. A power transmission control apparatus for a vehicle according to claim 2, wherein, when the vehicle starts, the control means operates in such a manner that, when a temperature difference obtained by subtracting a temperature of the second clutch from that of the first clutch is less than a second predetermined value, the control means controls the first clutch into the half-engaged state and the second clutch into the disengaged state in a state in which the first gear is established in the first mechanism section; and, when the temperature difference is equal to or greater than the second predetermined value, the control means controls each of the first and second clutches into the half-engaged state in a state in which the first and second gears are established in the first and second mechanism sections, respectively, or controls the second clutch into the half-engaged state and the first clutch into the disengaged state in a state in which the second gear is established in the second mechanism section.

7. A power transmission control apparatus for a vehicle according to claim 2, wherein, when both the first and second clutches are used as the start clutch, the control means determines a ratio of the clutch torque of the second clutch to the sum of the clutch torques of the first and second clutches on the basis of a temperature of the first clutch, an amount by which an acceleration operation member is operated by a driver of the vehicle, and a gradient of a road on which the vehicle starts.

8. A power transmission control apparatus for a vehicle according to claim 2, wherein, when at least the second clutch is used as the start clutch and a temperature of the second clutch is higher than a third temperature, the control means reduces drive torque of the drive source of the vehicle.

9. A power transmission control apparatus for a vehicle according to claim 8, wherein the control means determines a reduction ratio of the drive torque of the drive source on the basis of the temperature of the second clutch, an amount by which an acceleration operation member is operated by a driver of the vehicle, and a gradient of a road on which the vehicle starts.

10. A power transmission control apparatus for a vehicle according to claim 8, wherein, when at least the second clutch is used as the start clutch and the temperature of the second clutch is higher than a fourth temperature, which is higher than the third temperature, the control means issues a warning.

11. A power transmission control apparatus for a vehicle according to claim 2, wherein, when both the first and second clutches are used as the start clutch, the control means changes the state of the second clutch from the half-engaged state to the disengaged state before the state of the first clutch changes from the half-engaged state to a full-engaged state which is an engaged state in which no slippage is involved.

* * * * *